United States Patent
Gorti et al.

(10) Patent No.: US 11,416,257 B2
(45) Date of Patent: Aug. 16, 2022

(54) HYBRID AND AGGREGRATE BRANCH PREDICTION SYSTEM WITH A TAGGED BRANCH ORIENTATION PREDICTOR FOR PREDICTION OVERRIDE OR PASS-THROUGH

(71) Applicant: International Business Machines Corporation, Armonk, NY (US)

(72) Inventors: Naga P. Gorti, Austin, TX (US); Ehsan Fatehi, Austin, TX (US); Nicholas R. Orzol, Austin, TX (US); Christian Zoellin, Austin, TX (US); Edmund J. Gieske, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/380,737

(22) Filed: Apr. 10, 2019

(65) Prior Publication Data

US 2020/0326951 A1   Oct. 15, 2020

(51) Int. Cl.
*G06F 9/38* (2018.01)
*G06F 11/34* (2006.01)

(52) U.S. Cl.
CPC .......... *G06F 9/3848* (2013.01); *G06F 9/3844* (2013.01); *G06F 11/34* (2013.01)

(58) Field of Classification Search
CPC ....... G06F 9/3844; G06F 9/3848; G06F 11/34
See application file for complete search history.

(56) References Cited

U.S. PATENT DOCUMENTS

| | | | | |
|---|---|---|---|---|
| 7,644,258 | B2 * | 1/2010 | Glew | G06F 9/3848 712/239 |
| 9,471,314 | B1 * | 10/2016 | Bonanno | G06F 9/3848 |
| 2004/0225872 | A1 * | 11/2004 | Bonanno | G06F 9/3848 712/239 |
| 2012/0166775 | A1 * | 6/2012 | Krishnamurthy | G06F 9/3848 712/239 |
| 2013/0332715 | A1 * | 12/2013 | Bonanno | G06F 9/3806 712/240 |
| 2014/0201508 | A1 * | 7/2014 | Busaba | G06F 9/38 712/239 |
| 2015/0046691 | A1 | 2/2015 | Heil et al. | |
| 2015/0301832 | A1 | 10/2015 | Zhang et al. | |
| 2015/0363204 | A1 | 12/2015 | Bonanno et al. | |
| 2018/0173533 | A1 * | 6/2018 | Soundararajan | G06F 9/3848 |
| 2019/0004803 | A1 * | 1/2019 | Al Sheikh | G06F 9/3848 |

OTHER PUBLICATIONS

Lai et al., "Improving Branch Prediction Accuracy with Parallel Conservative Correctors", May 2005, pp. 334-341.*

* cited by examiner

*Primary Examiner* — David J. Huisman
(74) *Attorney, Agent, or Firm* — Patterson + Sheridan, LLP (57) ABSTRACT

Branch prediction in an instruction using a tag orientation predictor (TOP) is described. When a branch instruction is hotly mis-predicted by a hybrid branch predictor, the branch is tracked over a longer time period using the TOP. Once the TOP has collected enough data to confidently predict a branch prediction, the TOP is used to override a branch prediction from the hybrid predictor when the TOP branch prediction.

20 Claims, 7 Drawing Sheets

| TAG | TAKEN | NOT TAKEN | COMPONENT 1 PREDICTION | COMPONENT 2 PREDICTION | COMBINED PREDICTION | TOP PREDICTION | TAKEN/ NOT TAKEN COUNTER | HYBRID COUNTER | HOT COUNTER |
|---|---|---|---|---|---|---|---|---|---|
| 0001 | 7 | 3 | 2 | 4 | 4 | 6 | 4 | 1 | 3 |
| ... | | | | | | | | | |
| ... | | | | | | | | | |
| ... | | | | | | | | | |

HYBRID AND AGGREGRATE BRANCH PREDICTION SYSTEM WITH A TAGGED BRANCH ORIENTATION PREDICTOR FOR PREDICTION OVERRIDE OR PASS-THROUGH

BACKGROUND

The present invention relates to computing systems, and more particularly, to branch prediction schemes employed in computing systems.

Hybrid branch prediction provides performance improvements to many programs, but hybrid branch prediction continues to be limited in its ability to track long term prediction characteristics for branches that may be routinely mis-predicted by the hybrid predictor. Long term tracking of the predictions and misses for a hybrid branch predictor is needed for more accurate predictions from the hybrid branch predictor and to decrease processing time for instructions caused by mis-predictions.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One embodiment includes a method for branch prediction using a tag orientation predictor (TOP) including: receiving a branch prediction for a branch instruction from a hybrid predictor including one or more predictor components, determining from a tag value of the branch instruction that the branch instruction is tracked by the TOP, determining a tracked classification from a TOP tracking table for the branch instruction based on previous branch predictions and branch prediction outcomes, and overriding the branch prediction with a TOP branch prediction when the tracked classification indicates that the TOP branch prediction is confidently predicted. Other embodiments of this aspect include corresponding computer systems, apparatus, and computer programs recorded on one or more computer storage devices, each configured to perform the actions of the methods.

In another embodiment, a system for branch prediction using a tag orientation predictor (TOP) is described. The system including: one or more computer processors, and a memory containing a program which when executed by the one or more processors performs an operation including: receiving a branch prediction for a branch instruction from a hybrid predictor including one or more predictor components, determining from a tag value of the branch instruction that the branch instruction is tracked by the TOP, determining a tracked classification from a TOP tracking table for the branch instruction based on previous branch predictions and branch prediction outcomes, and overriding the branch prediction with a TOP branch prediction when the tracked classification indicates that the TOP branch prediction is confidently predicted.

In another embodiment, a computer program product for branch prediction using a tag orientation predictor (TOP) is described. The computer program product including: a computer-readable storage medium having computer-readable program code embodied therewith, the computer-readable program code executable by one or more computer processors to perform an operation, the operation including: receiving a branch prediction for a branch instruction from a hybrid predictor including one or more predictor components; determining from a tag value of the branch instruction that the branch instruction is tracked by the TOP; determining a tracked classification from a TOP tracking table for the branch instruction based on previous branch predictions and branch prediction outcomes; and overriding the branch prediction with a TOP branch prediction when the tracked classification indicates that the TOP branch prediction is confidently predicted.

DETAILED DESCRIPTION

When a processor encounters a branch instruction, the processor issues a prediction of the outcome of the branch. The processor then begins fetching and executing instructions along this predicted path. Eventually, the processor proceeds through the instructions to execute the original branch. At this point, the processor understands whether its prediction is right. If the prediction is wrong, the processor must backtrack to the branch instruction in the pipeline and throw away/flush the speculative work executed since fetching the branch instruction. This in turn causes processing delays and wasted resources. As described herein, a branch in the instruction set occurs when there are two or more possible instructions to be executed next in the instruction set. Several solutions exist to address mis-prediction in branches and increase the throughput of instructions successfully executed by a processor. For example, hybrid branch prediction mechanisms (hybrid branch predictors) combine several different prediction functions to predict a branch instruction path and select a branch instruction prediction for execution.

In some examples, a hybrid branch predictor tracks/predicts branches based upon bits in an instruction address as well as outcomes of recent branches separately. In some examples, the hybrid predictor produces a best prediction using both the instruction address and the recent branches and thus typically increases the processing speed and efficiency for executing the instruction by avoiding mis-predictions. Additionally, in some examples, the hybrid predictor can be coupled with an aggregate predictor (where the aggregate predictor is similar to the hybrid predictor except that it takes in more input information regarding branches and deliberates longer to provide a prediction). In some examples, the branch instructions are tracked using tags at the aggregate predictor. The tags are used to isolate and track characteristics of individual branches. Both hybrid and aggregate predictors employ small counters to track the history of the branches. The counters need to stay small since they directly affect the area and power consumed by the branch predictors. However, the methods described above can sometimes fail to account for long term prediction due to the small size of counters, and destructive interference, and long term variance in the behavior of a branch instruction and thus can still fail to correctly predict hotly or often mis-predicted branch instructions in the instruction set.

The methods and systems described herein provide for tracking long term behavior (e.g., 64 past occurrences of the branch) of individual branch instructions in an instruction set, which complement a hybrid predictor and the aggregate predictor described above. The tagged orientation predictor (TOP) described herein uses one or more counters which record statistics such as the number of times the branch is taken and not-taken, a number of times the hybrid predictor correctly predicts versus incorrectly predicts, as well as an individual merit/accuracy of each of the components in the hybrid predictor for predicting an individual branch. Based on this information, the TOP categorizes each tracked branch, using categories such as a random branch which is biased taken or not branch, very hard to predict branch (a hybrid predictor accuracy has less than 50% accuracy), a branch affiliated to only one of the hybrid predictor structures, etc. In some examples, the hybrid predictor branch prediction is then overridden by the TOP and a TOP branch prediction is used to take or not take the branch instruction.

Figure 1:
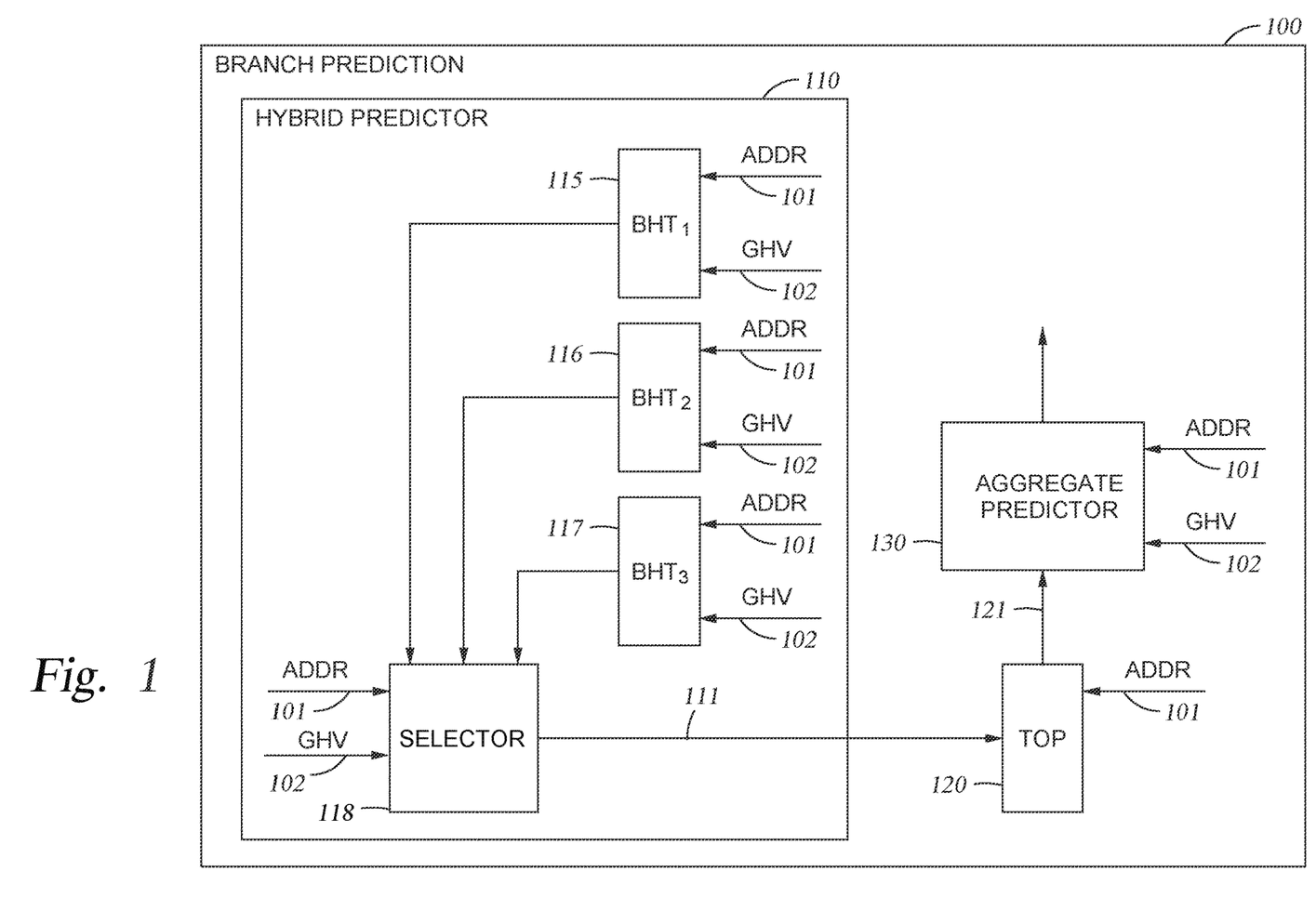
FIG. 1 illustrates a system for branch prediction, according to one embodiment described herein.

FIG. 1 illustrates a system for branch prediction, according to one embodiment described herein. As shown, FIG. 1 illustrates branch prediction system 100 which includes a hybrid predictor 110, a tag orientation predictor (TOP) 120, and an aggregate predictor 130. In general, the hybrid predictor 110 includes several branch prediction mechanisms to provide a branch prediction for a branch in an instruction. The components of the hybrid predictor shown in FIG. 1 and described herein are example embodiments and may include alternate prediction mechanisms.

For example, the hybrid predictor 110 includes a first predictor 115 such as first branch history table (BHT), a second predictor 116, such as a second BHT, a third predictor 117 such as a third BHT, and a fourth predictor/selector 118 to select from the predictors 115-117. The first predictor 115, second predictor 116, and third predictor 117 use the address 101 and optionally a global history vector (GHV) 102 of previous taken or not-taken branches to each generate a branch prediction. The fourth predictor 118 uses the address 101 and optionally the GHV 102 to select a branch prediction 111 which is then sent to the TOP 120 for further processing. For example, the TOP 120 uses the address 101 and the TOP tracking table described in FIG. 3 to determine a TOP branch prediction 121. While illustrated herein with a discrete number of predictors, the hybrid predictor 110 may include more or less predictor components and selectors to generate a hybrid prediction.

In some examples, the branch prediction 111 is inverted/modified by the TOP 120 for branches classified as very hard to predict branches. In an example, where branches are correctly predicted by only one hybrid prediction component (e.g., the second predictor 116), another component's (e.g., the first predictor 115) updates are gated off to reduce pollution and improve tracking of other branches in that component of the hybrid predictor 110. In some examples described herein, branches tracked by the TOP 120 are aged out of TOP tracking based on an effectiveness of the TOP 120 and improving prediction of the branch instruction by the hybrid predictor 111 and a hotness of the branch prediction in the instruction stream.

Figure 3:
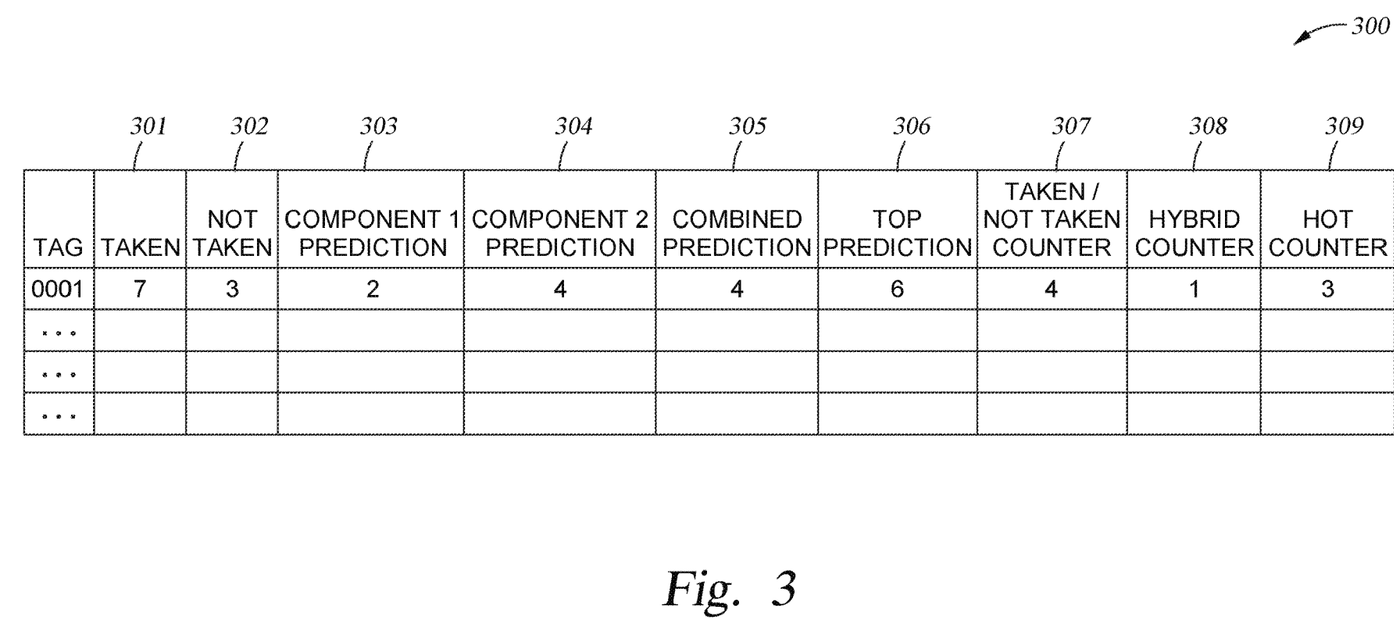
FIG. 3 is an example branch prediction table, according to one embodiment described herein.

In some examples, a separate hotness counter is maintained in the TOP tracking table 300 described in relation to FIG. 3, which increments to show that TOP is essential for tracking the incumbent branch instruction, or decrements to indicate too much pressure from other contenders trying to install/initiate tracking in TOP or to indicate that the hybrid predictor is enough to track this branch. In this example, there is no added benefit of TOP prediction/tracking in the TOP 120, and/or another contender branch may benefit more from using the TOP 120.

In some examples, on a mis-predict, a branch instruction is installed and/or the tracking of the branch instruction prediction is initiated by the TOP 120. In most cases, a single mis-predict is not enough for the branch instruction to start being tracked by the TOP 120. In general, the TOP 120 achieves a clear separation of a branch that can be tracked well using the hybrid predictor and one that is hard to predict and should be tracked by the TOP 120. Thus, the TOP 120 only tracks a branch instruction where the hybrid predictors hotly mis-predict. In some cases, the mis-predicted branches also pass through a probability gate to be eligible to be installed in the TOP 120.

Figure 2:
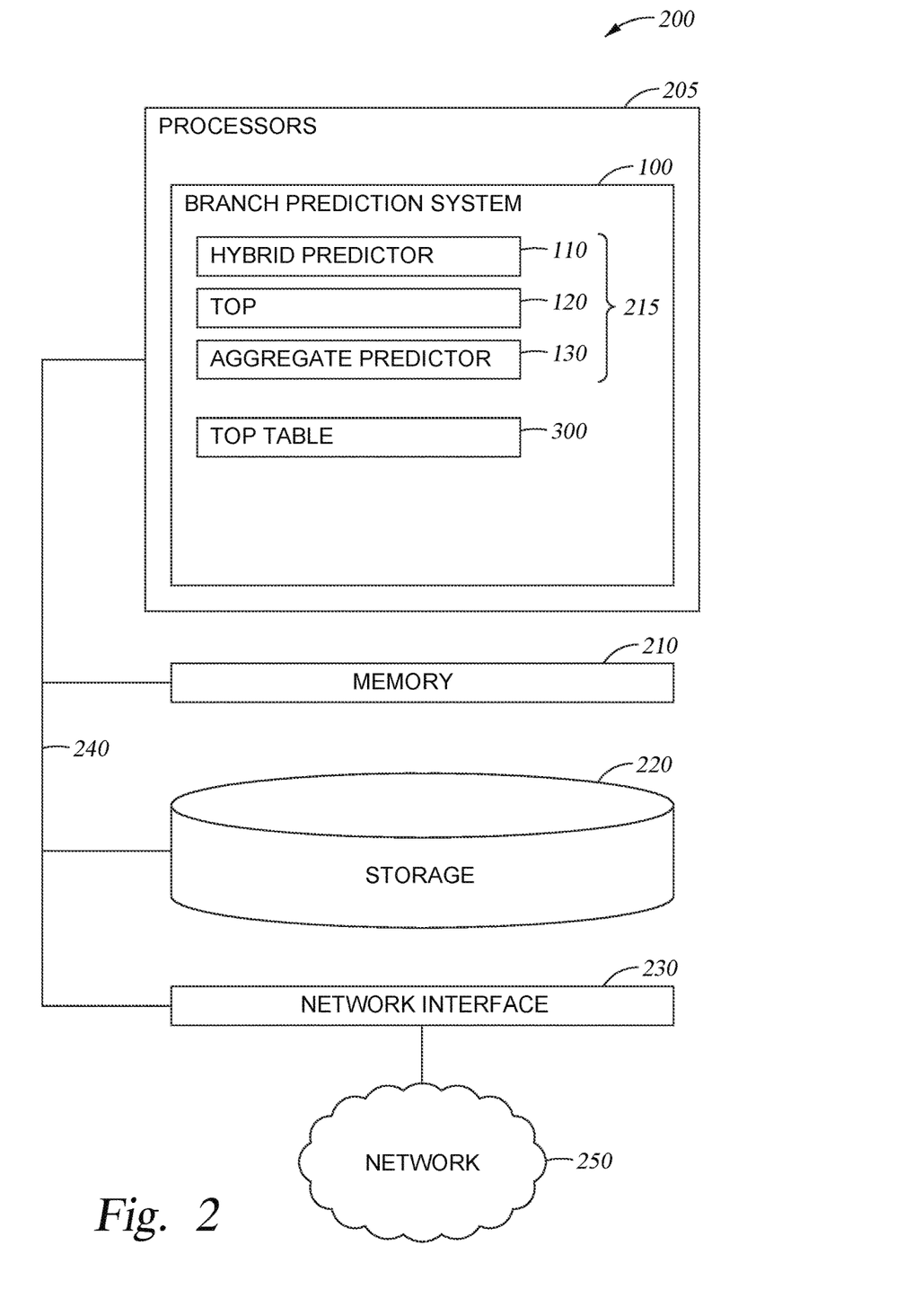
FIG. 2 is a block diagram of a system for branch prediction, according to one embodiment described herein.

FIG. 2 is a block diagram of a system for branch prediction, according to one embodiment described herein. As shown in FIG. 2, the arrangement 200 includes processors (or processing units) 205, a system memory 210, a storage system 220, network interface 230 connected to network 250, and a bus 240 that couples various system components including the system memory 210 and storage system 220 to processors 205. As shown, the processors 205 include branch prediction system 100 configured to execute the various functions described herein. In other embodiments, arrangement 200 is distributed and includes a plurality of discrete computing devices that are connected through wired or wireless networking.

Bus 240 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System memory 210 can include computer system readable media in the form of volatile memory, such as random access memory (RAM) and/or cache memory. The arrangement 200 may further include other removable/non-removable, volatile/non-volatile computer system storage media. By way of example, storage system 220 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 240 by one or more data media interfaces. As will be further depicted and described below, memory 210 may include at least one program product having a set (e.g., at least one) of program modules that are configured to carry out the functions of various embodiments described herein.

The arrangement 200 may further include other removable/non-removable, volatile/non-volatile computer system storage media. In some examples storage system 220 may be included as part of memory 210 and may typically provide a non-volatile memory for the networked computing devices, and may include one or more different storage elements such as Flash memory, a hard disk drive, a solid state drive, an optical storage device, and/or a magnetic storage device.

The processors 205 may include a plurality of modules 215 for performing various functions described herein. As shown, modules 215 include hybrid predictor 110, TOP 120, and aggregate predictor 130. In some examples, the hybrid predictor 110, the TOP 120, and the aggregate predictor function as hardware elements, such as on processors 205.

FIG. 3 is an example branch prediction table, according to one embodiment described herein. In some examples, upon installing a branch instruction in TOP 120, the TOP 120 begins tracking the branch instruction predictions in the TOP tracking table 300. For example, as shown, the branch instruction associated with the tag "0001" is shown in FIG. 3. In some examples, the tag includes a tag directly mapped and indexed by bits from an instruction address. The TOP 120, during one or more executions of the branch, updates the TOP tracking table 300 with information such as the number of times the branch instruction is taken (count 301) and not taken (count 302) in the execution of the instruction set. The TOP 120 also updates the TOP tracking table with an indication of a number of times each of the component predictions from each of the one or more predictor components of the hybrid predictor 110 correctly predicts whether the branch is taken and not taken. For example, as shown for the tag "0001", the component 1 (first predictor 115) prediction has been correct 2 times (count 303), the component 2 (second predictor 116) has been correct 4 times (count 304) and the combined prediction (the fourth predictor 118) has been correct 4 times (count 305).

The TOP 120 also updates the TOP tracking table 300 with an indication of how often the TOP 120 prediction is correct in count 306 (e.g., 6 times for the tag "0001"). The TOP tracking table 300 also includes a taken/not taken counter 307 to track the number of times the branch instruction is taken, i.e., the counter 307 is incremented when the branch is taken and decremented if not taken. The TOP tracking table 300 further includes a hybrid counter 308 which increments when the hybrid predictor 110 is correct and decrements when the hybrid predictor is incorrect, and includes a hot counter 309 which increments when the TOP 120 is correct and the hybrid predictor 110 is incorrect and decrements when the hybrid predictor 110 is correct and the TOP 120 is incorrect.

Figure 4A:
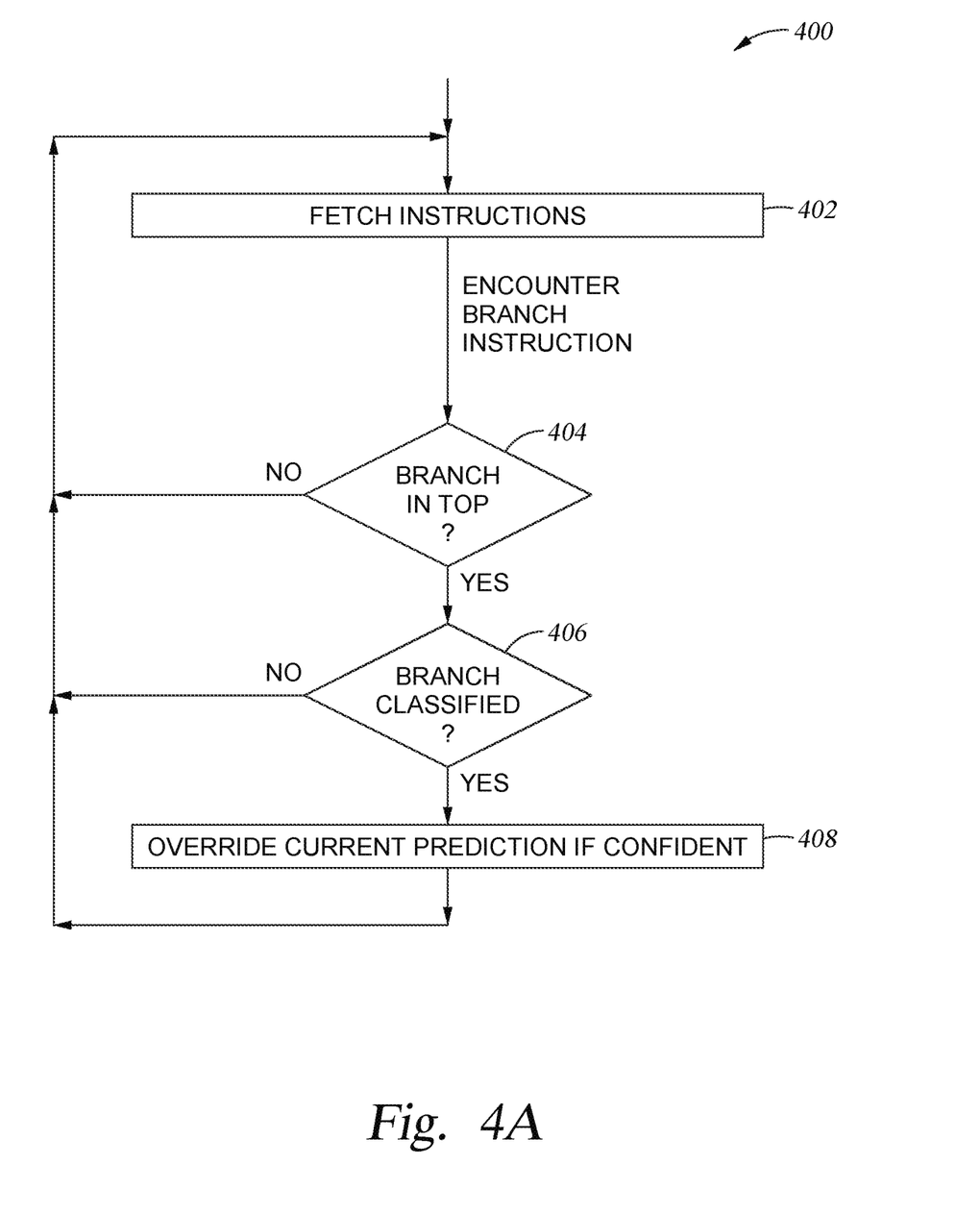
FIGS. 4A-B are example methods for branch orientation prediction, according to embodiments described herein.

FIG. 4A is an example method for branch orientation prediction, according to one embodiment described herein. As shown, method 400 begins at block 402 where the branch prediction system 100 fetches instructions for an instruction set. When the branch prediction system 100 encounters a branch instruction, the hybrid predictor 110 and aggregate predictor 130 begin processes to predict which path of the branch instruction to process and/or proceed with executing. At block 404, the TOP 120 receives a branch prediction 111 for a branch instruction from a hybrid predictor, e.g., hybrid predictor 110, where the branch prediction includes one or more predictor components, including the predictions from the various components of the hybrid predictor 110. The TOP 120 determines from a tag value of the branch instruction whether the branch instruction is tracked by the TOP 120. For example, for the tag "0001," the TOP 120 looks up in the TOP tracking table 300, that the instruction is currently tracked. In an example, where the branch instruction is not tracked by TOP 120 and is not a hotly mis-predicted branch, the TOP 120 acts as a pass-through between the hybrid predictor and the aggregate predictor 130 and does not alter or track the branch instruction prediction.

In an example where the branch instruction is tracked by the TOP 120, method 400 proceeds to block 406, where the TOP 120 determines, from the TOP tracking table 300, a tracked classification for the branch instruction based on previous branch predictions and branch prediction outcomes. For example, when the branch instruction has been tracked for a long term such that the accuracy of predictions for the various components of the hybrid predictor 110 and the hybrid predictor 110 is known by the TOP 120, then the method 400 proceeds to block 408, where TOP 120 overrides the branch prediction with a TOP branch prediction when the tracked classification indicates that the TOP branch prediction is confidently predicted. In some examples, the TOP 120 uses a variety of factors to determine the classification and override action.

For example, a first classification C1 is when the tag "0001" has a taken count 301 greater than a first threshold "x" (e.g., 4) multiplied by the not-taken count 302 and the taken count 301 is also greater than the combined prediction count 305. In this example, the TOP 120 classifies the tagged branch as "bias toward taken" and will predict that the branch is taken.

In another example, second classification C2 is when the not taken count 302 is greater than the first threshold "x" multiplied by the taken count 301, and the not-taken count 302 is also greater than the combined prediction count 305. In this example, the TOP 120 classifies the tagged branch as "bias toward not-taken" and will predict that the branch is not-taken.

Additional classification rules include a third classification C3 when the TOP prediction count 306 is greater than the combined prediction count 305 plus a second threshold "z" (e.g., 1). In this example, the TOP 120 classifies the tagged branch to use the most significant bit of the taken/not taken count 307 as the TOP branch prediction. In one example, when the hybrid counter 308 is below a given threshold, the branch prediction 111 is inverted by the TOP 120 as the TOP branch prediction.

In another example, a fourth classification C4 includes when the component 1 prediction count 303 is greater than the combined prediction count 305 plus a third threshold "y." In this example, the second component is ignored is not updated when the branch instruction is fetched again. In contrast, when component 2 prediction count 304 is greater than the combined prediction count 305 plus the third threshold "y" (e.g., 1), the first component is ignored by the TOP 120 and is not updated when the branch instruction is fetched again. As described herein, C1-C4 are example classifications and more classification and mechanisms may be incorporated into the TOP 120 based on requirements and observations of the various instruction branches.

Figure 4B:
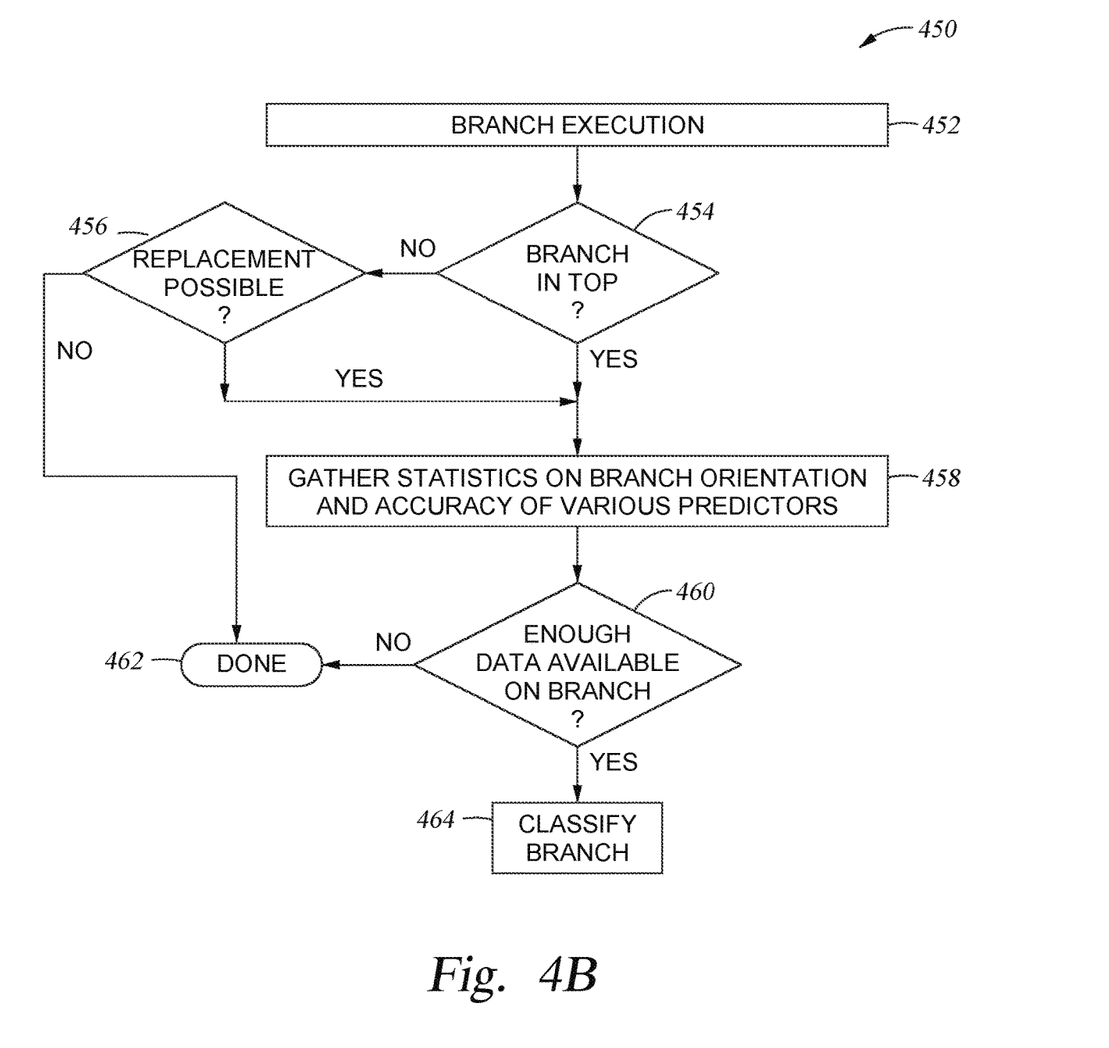
Figure 6:
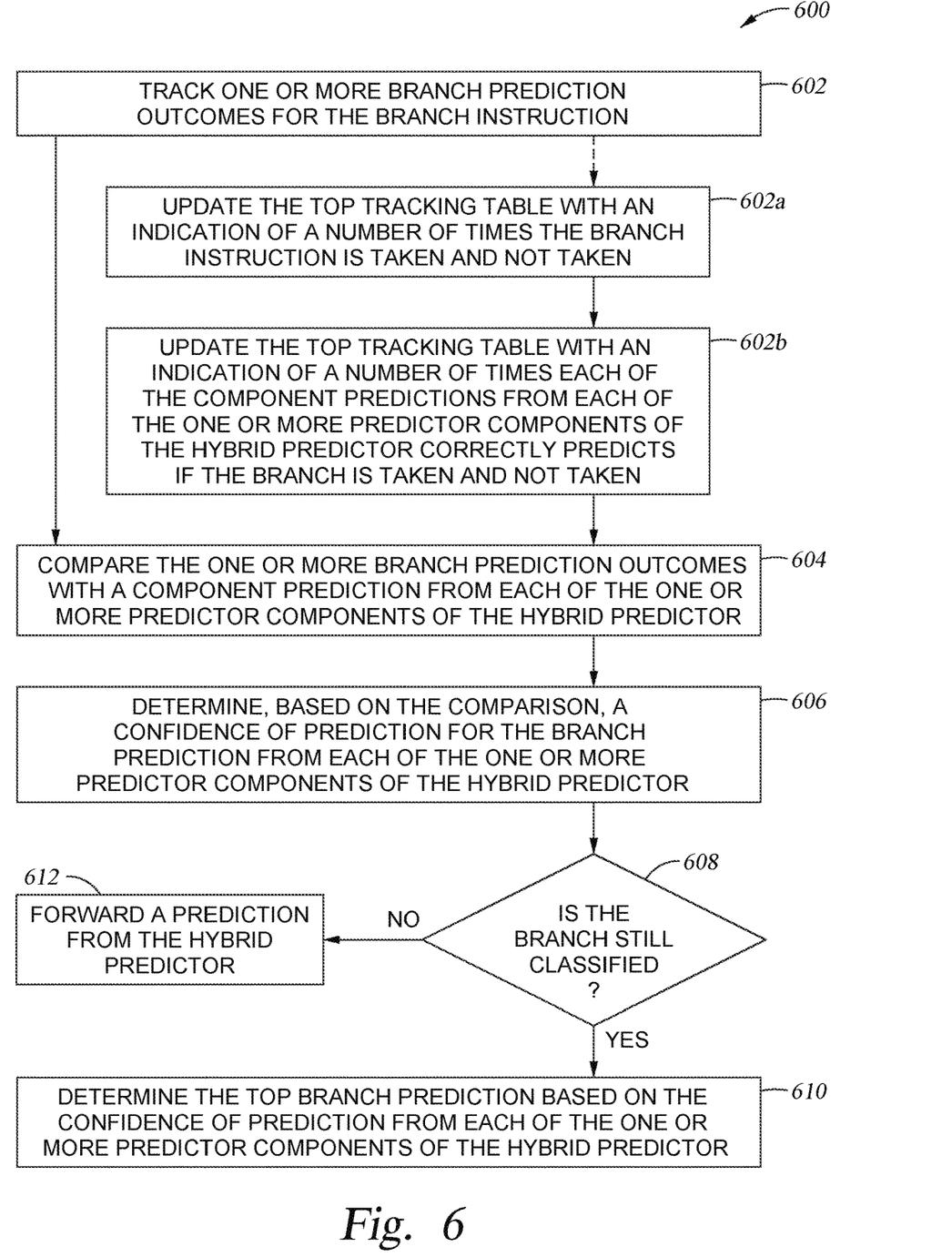
FIG. 6 is a method for updating a tagged orientation predictor, according to one embodiment described herein.

In an example where the branch instruction is not classified or not enough data has been gathered to classify the branch instruction prediction, the method 400 returns to block 402 and the branch instruction predictions are tracked by the TOP 120 during execution, as described in relation to FIGS. 4B and 6. In some examples, the combined number of taken and not taken counts 301 and 302 may be larger than a threshold (e.g., 8) in order to ensure enough data has been gathered to classify the branch.

FIG. 4B is an example method for branch orientation prediction tracking during execution of a branch instruction, according to one embodiment. Method 450 begins at block 452 where the system 100 begins execution of the predicted branch instruction from the aggregate predictor 130. In some examples, as described in relation to FIG. 5, the TOP 120 determines whether the branch is a hard to predict branch. In an example where the branch is a hard to predict branch, the method 450 proceeds to block 454, where the TOP 120 determines whether the branch is tracked by the TOP 120 in the table 300. In general, there is a small probability of installation of the branch/initiation of the tracking of the branch by the TOP 120 upon each individual mis-predict. However, the likelihood of tracking increases with each subsequent mis-predict as the hotness of the mis-predict is increased.

When a mis-predicted branch is not currently tracked by the TOP 120, method 450 proceeds to block 456, where the TOP determines whether replacement of a tracked branch in the TOP tracking table 300 is possible. When the TOP tracking table 300 is not full and/or replacement of a tracked branch is possible, the method proceeds to block 458. Additionally, when the TOP 120, at block 454, determines that the branch is tracked in by the TOP 120 in the TOP tracking table 300, the method proceeds to block 458.

At block 458, the TOP 120 gathers and stores statistics on branch orientation for the executed branch and the accuracy of the various predictors and/or prediction mechanisms/functions of the hybrid predictor 110 in the table 300. In some examples, the TOP gathers statistics and accuracy of the predictors as described in relation to FIG. 6.

At block 460, the TOP 120 determines whether there is enough data for the TOP 120 to classify the branch prediction according to the gathered information. When the TOP 120 determines there is enough information, method 450 proceeds to block 464 where the TOP 120 classifies the branch according to the TOP tracking table 300 and as described in relation to FIG. 3. In an example where the TOP 120 determines there is not enough information, method 450 proceeds to block 462 where the branch finishes execution and the system 100 proceeds to the next instruction, while updating the table 300 when the execution of the branch is finished.

Figure 5:
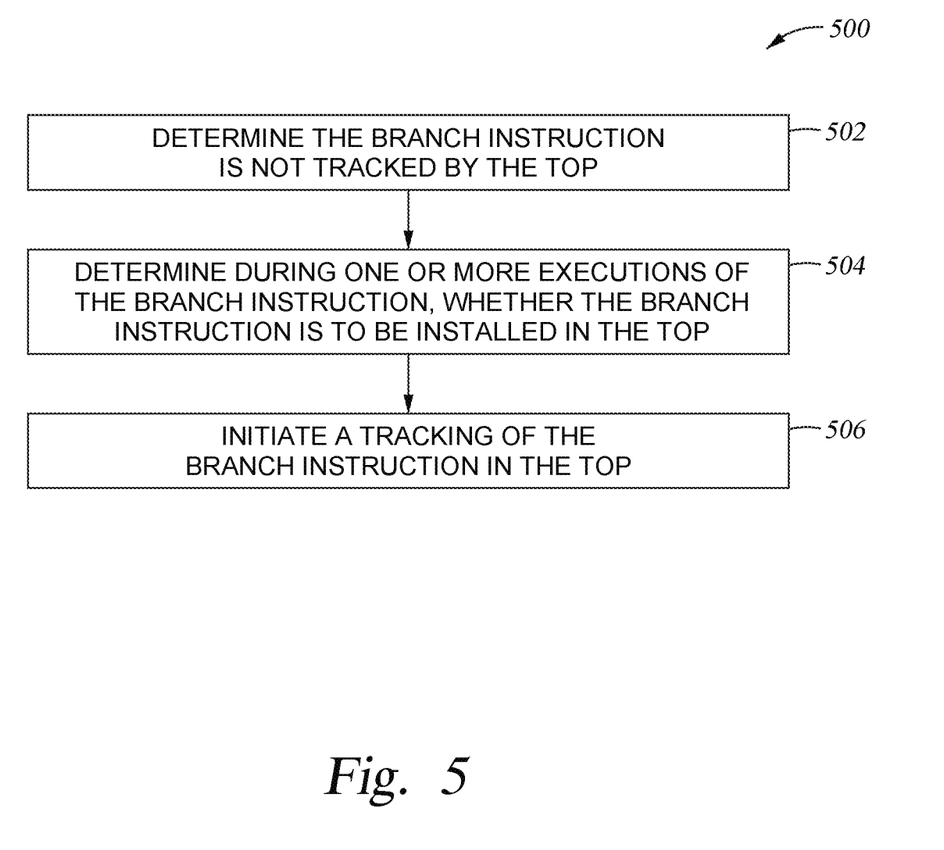
FIG. 5 is an example flowchart for branch orientation tracking, according to one embodiment described herein.

FIG. 5 is an example flowchart for branch orientation tracking, according to one embodiment described herein. For example, as described in relation to FIG. 4B, during branch execution at block 452, method 500 begins at block 502, where the TOP 120 determines the branch instruction is not tracked by the TOP 120. When the branch is not tracked by the TOP 120, it is assumed that the branch is predicted reasonably well by the hybrid predictor 110 and the aggregate predictor 130. At block 504, the TOP 120 determines, during one or more executions of the branch instruction, whether the branch instruction is to be installed in the TOP. For example, when the branch is frequently mis-predicted, the method proceeds to block 506, where the TOP 120 initiates a tracking of the branch instruction by installing the branch in the TOP 120 and proceeds to block 454 in FIG. 4B.

FIG. 6 is a method for updating a tagged orientation predictor, according to one embodiment described herein. At block 602, the TOP 120, during one or more executions of the branch instruction, tracks one or more branch prediction outcomes for the branch instruction. In some examples, the TOP 120 tracks the one or more branch predictions by updating the TOP tracking table 300 with an indication of a number of times the branch instruction is taken and not taken as shown in block 602a. At block 602b, the TOP 120 also updates the TOP tracking table 300 with an indication of a number of times each of the component predictions from each of the one or more predictor components of the hybrid predictor correctly predicts whether the branch is taken and not taken such as described in relation to table 300 in FIG. 3. Furthermore, in order to provide an accurate prediction and assessment of the hybrid predictor 110 and the TOP 120, the TOP tracks a long term behavior of the branch prediction outcomes for the branch. For example, the TOP 120 tracks the last approximately 64 outcomes of the branch and the associated branch predictions. In some examples, when the counters shown in FIG. 3 reach a maximum threshold value, the counters are reset, such as to half the current count.

Method 600 proceeds to block 604, where the TOP 120 compares the one or more branch prediction outcomes with a component prediction from each of the one or more predictor components of the hybrid predictor. At block 606, the TOP 120 determines, based on the comparison, a confidence of prediction for the branch prediction from each of the one or more predictor components of the hybrid predictor.

At block 608, the TOP 120 determines, based on the confidence prediction for the one or more predictor components of the hybrid predictor 110 if the branch instruction can be classified, such as classified in one of the classifications C1-C4. When the branch remains classified, method 600 proceeds to block 610, where TOP 120 determines the TOP branch prediction 121 based on the confidence of prediction from each of the one or more predictor components of the hybrid predictor, or additional prediction mechanisms built into the TOP 120, such as the classifications C1-C2, etc., in the TOP tracking table 300.

In an example, where the branch instruction is not currently classified, method 600 proceeds to block 612, where the TOP 120 does not issue a prediction and instead forwards a prediction from the hybrid predictor. In some examples, the prediction from hybrid predictor is carried forward to the aggregate predictor 130. In some examples, as the hybrid predictor predictions become more accurate, the branch installed on the TOP becomes more replaceable by other branch instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the TOP 120) or related data available in the cloud.

While the foregoing is directed to embodiments of the present invention, other and further embodiments of the invention may be devised without departing from the basic scope thereof, and the scope thereof is determined by the claims that follow.

What is claimed is:

1. A method for branch prediction using a tag orientation predictor (TOP) comprising:
    receiving, at the TOP, a hybrid branch prediction for a branch instruction from a hybrid predictor comprising a plurality of predictor components, wherein the TOP is between the hybrid predictor and an aggregate predictor, wherein the aggregate predictor uses tag based tracking to track branch instruction characteristics;
    determining from a tag value of the branch instruction that the branch instruction is tracked by the TOP, wherein the branch instruction is tracked by the TOP when the hybrid predictor frequently provides mis-predictions for the branch instruction, and wherein the TOP acts as a pass-through function, from the hybrid predictor to the aggregate predictor, for the hybrid branch prediction when the hybrid predictor does not frequently provide mis-predictions for the branch instruction;
    determining a tracked classification from a TOP tracking table for the branch instruction based on previous branch predictions and branch prediction outcomes; and
    overriding the hybrid branch prediction with a TOP branch prediction when the tracked classification indicates that the TOP branch prediction is confidently predicted.

2. The method of claim 1, wherein the method further comprises:
    determining the branch instruction is not tracked by the TOP;
    determining, during one or more executions of the branch instruction, that the branch instruction is to be installed in the TOP; and
    initiating a tracking of the branch instruction in the TOP.

3. The method of claim 1, further comprising:
    during one or more executions of the branch instruction, tracking one or more branch prediction outcomes for the branch instruction;
    comparing the one or more branch prediction outcomes with a component prediction from each of the plurality of predictor components of the hybrid predictor;
    determining, based on the comparing, a confidence of prediction for the component prediction from each of the plurality of predictor components of the hybrid predictor; and
    determining the TOP branch prediction based on the confidence of prediction from each of the plurality of predictor components of the hybrid predictor.

4. The method of claim 3, wherein tracking the one or more branch prediction outcomes for the branch instruction comprises:
    updating the TOP tracking table with an indication of a number of times the branch instruction is taken and not taken; and
    updating the TOP tracking table with an indication of a number of times each of the component predictions from the plurality of predictor components of the hybrid predictor correctly predicts that the branch instruction is taken and not taken.

5. The method of claim 3, wherein tracking the one or more branch prediction outcomes comprises:
    tracking a long term behavior of the one or more branch prediction outcomes for the branch instruction.

6. The method of claim 3, wherein the TOP tracking table comprises:
    a branch taken counter;
    a branch not taken counter;
    one or more counters for tracking an accuracy of the plurality of predictor components of the hybrid predictor;
    a counter to track an accuracy of the TOP branch prediction; and
    one or more counters to track a TOP effectiveness.

7. The method of claim 6, further comprising:
    determining from the one or more counters to track the TOP effectiveness that the TOP effectiveness is below a threshold; and
    forwarding a prediction from the hybrid predictor.

8. A system for branch prediction using a tag orientation predictor (TOP) comprising:
    one or more computer processors; and
    a memory containing a program which when executed by the one or more computer processors causes the one or more computers processors to perform an operation comprising:
        receiving, at the TOP, a hybrid branch prediction for a branch instruction from a hybrid predictor comprising a plurality of predictor components, wherein the TOP is between the hybrid predictor and an aggregate predictor, wherein the aggregate predictor uses tag based tracking to track branch instruction characteristics;
        determining from a tag value of the branch instruction that the branch instruction is tracked by the TOP, wherein the branch instruction is tracked by the TOP when the hybrid predictor frequently provides mis-predictions for the branch instruction, and wherein the TOP acts as a pass-through function, from the hybrid predictor to the aggregate predictor, for the hybrid branch prediction when the hybrid predictor does not frequently provide mis-predictions for the branch instruction;

determining a tracked classification from a TOP tracking table for the branch instruction based on previous branch predictions and branch prediction outcomes; and overriding the hybrid branch prediction with a TOP branch prediction when the tracked classification indicates that the TOP branch prediction is confidently predicted.

9. The system of claim 8, wherein the operation further comprises:

determining the branch instruction is not tracked by the TOP;

determining, during one or more executions of the branch instruction, that the branch instruction is to be installed in the TOP; and initiating a tracking of the branch instruction in the TOP.

10. The system of claim 8, wherein the operation further comprises:

during one or more executions of the branch instruction, tracking one or more branch prediction outcomes for the branch instruction;

comparing the one or more branch prediction outcomes with a component prediction from each of the plurality of predictor components of the hybrid predictor;

determining, based on the comparing, a confidence of prediction for the component prediction from each of the plurality of predictor components of the hybrid predictor; and determining the TOP branch prediction based on the confidence of prediction from each of the plurality of predictor components of the hybrid predictor.

11. The system of claim 10, wherein tracking the one or more branch prediction outcomes for the branch instruction comprises:

updating the TOP tracking table with an indication of a number of times the branch instruction is taken and not taken; and updating the TOP tracking table with an indication of a number of times each of the component predictions from the plurality of predictor components of the hybrid predictor correctly predicts that the branch instruction is taken and not taken.

12. The system of claim 10, wherein tracking the one or more branch prediction outcomes comprises:

tracking a long term behavior of the one or more branch prediction outcomes for the branch instruction.

13. The system of claim 10, wherein the TOP tracking table comprises:

a branch taken counter;

a branch not taken counter;

one or more counters for tracking an accuracy of the one or more predictor components of the hybrid predictor;

a counter to track an accuracy of the TOP branch prediction; and one or more counters to track a TOP effectiveness.

14. The system of claim 13, wherein the operation further comprises:

determining from the one or more counters to track the TOP effectiveness that the TOP effectiveness is below a threshold; and forwarding a prediction from the hybrid predictor.

15. A computer program product for branch prediction using a tag orientation predictor (TOP) comprising:

a non-transitory computer-readable storage medium having computer-readable program code embodied therewith, the computer-readable program code executable by one or more computer processors to perform an operation, the operation comprising:

receiving, at the TOP, a hybrid branch prediction for a branch instruction from a hybrid predictor comprising a plurality of predictor components, wherein the TOP is between the hybrid predictor and an aggregate predictor, wherein the aggregate predictor uses tag based tracking to track branch instruction characteristics;

determining from a tag value of the branch instruction that the branch instruction is tracked by the TOP, wherein the branch instruction is tracked by the TOP when the hybrid predictor frequently provides mis-predictions for the branch instruction, and wherein the TOP acts as a pass-through function, from the hybrid predictor to the aggregate predictor, for the hybrid branch prediction when the hybrid predictor does not frequently provide mis-predictions for the branch instruction;

determining a tracked classification from a TOP tracking table for the branch instruction based on previous branch predictions and branch prediction outcomes; and overriding the hybrid branch prediction with a TOP branch prediction when the tracked classification indicates that the TOP branch prediction is confidently predicted.

16. The computer program product of claim 15, wherein the operation further comprises:

determining the branch instruction is not tracked by the TOP;

determining, during one or more executions of the branch instruction, that the branch instruction is to be installed in the TOP; and initiating a tracking of the branch instruction in the TOP.

17. The computer program product of claim 15, wherein the operation further comprises:

during one or more executions of the branch instruction, tracking one or more branch prediction outcomes for the branch instruction;

comparing the one or more branch prediction outcomes with a component prediction from each of the plurality of predictor components of the hybrid predictor;

determining, based on the comparing, a confidence of prediction for the component prediction from each of the plurality of predictor components of the hybrid predictor; and determining the TOP branch prediction based on the confidence of prediction from each of the plurality of predictor components of the hybrid predictor.

18. The computer program product of claim 17, wherein tracking the one or more branch prediction outcomes for the branch prediction comprises:

updating the TOP tracking table with an indication of a number of times the branch instruction is taken and not taken; and updating the TOP tracking table with an indication of a number of times each of the component predictions from the plurality of predictor components of the hybrid predictor correctly predicts that the branch instruction is taken and not taken.

19. The computer program product of claim 17, wherein the TOP tracking table comprises:

a branch taken counter;
a branch not taken counter;
one or more counters for tracking an accuracy of the one or more predictor components of the hybrid predictor;
a counter to track an accuracy of the TOP branch prediction; and
one or more counters to track a TOP effectiveness.

20. The computer program product of claim 19, wherein the operation further comprises:
determining from the one or more counters to track the TOP effectiveness that the TOP effectiveness is below a threshold; and
forwarding a prediction from the hybrid predictor.

* * * * *